(12) United States Patent
Kim et al.

(10) Patent No.: US 12,497,104 B2
(45) Date of Patent: Dec. 16, 2025

(54) VEHICLE CHASSIS

(71) Applicants: HYUNDAI MOTOR COMPANY, Seoul (KR); KIA CORPORATION, Seoul (KR)

(72) Inventors: Do Hoi Kim, Sejong-si (KR); Il Do Kim, Suwon-si (KR); Dae Ho Lee, Busan (KR); Tae Ou Park, Seongnam-si (KR); Sea Cheoul Song, Ansan-si (KR); Dong Ha Kang, Seoul (KR); Cheol Ung Lee, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 417 days.

(21) Appl. No.: 18/218,472

(22) Filed: Jul. 5, 2023

(65) Prior Publication Data
US 2024/0199123 A1  Jun. 20, 2024

(30) Foreign Application Priority Data
Dec. 15, 2022  (KR) .......... 10-2022-0176025

(51) Int. Cl.
*B62D 21/03* (2006.01)
*B22D 19/00* (2006.01)
*B23K 26/352* (2014.01)
*B62D 21/11* (2006.01)
*B62D 21/15* (2006.01)
(Continued)

(52) U.S. Cl.
CPC ......... *B62D 21/03* (2013.01); *B22D 19/0081* (2013.01); *B23K 26/355* (2018.08); *B62D 27/065* (2013.01); *B62D 21/11* (2013.01); *B62D 21/155* (2013.01); *B62D 25/2027* (2013.01)

(58) Field of Classification Search
CPC .... B22D 19/0081; B22D 19/02; B22D 21/11; B22D 21/155; B22D 25/08; B22D 25/20; B22D 25/2027; B22D 27/065; B22D 29/00; B22D 29/008; B23K 26/355; B60Y 2410/125
See application file for complete search history.

(56) References Cited

U.S. PATENT DOCUMENTS 6,003,898 A * 12/1999 Teply .................. B62D 29/008
296/29

FOREIGN PATENT DOCUMENTS

CN  214084438 U  *  8/2021
KR  102297405 B1   9/2021

OTHER PUBLICATIONS

CN214084438U (Year: 2021).*
DE 9954575 A1 (Year: 2000).*

* cited by examiner

*Primary Examiner* — Lori Lyjak
(74) *Attorney, Agent, or Firm* — Lempia Summerfield Katz LLC

(57) ABSTRACT

A vehicle chassis includes a pair of rear side members disposed on a rear floor of a vehicle so as to extend in a longitudinal direction of the vehicle while being spaced apart in a transverse direction of the vehicle. The pair of rear side members is manufactured in a casting process A cross member is configured to extend in the transverse direction of the vehicle and is manufactured in an extrusion process. The cross member is inserted into a mold when the rear side
(Continued)

members are cast such that both ends of the cross member are connected to the rear side members disposed on both sides, respectively.

19 Claims, 14 Drawing Sheets

(51) Int. Cl.
    *B62D 25/20*     (2006.01)
    *B62D 27/06*     (2006.01)

200(200-1,200-2,200-3)

VEHICLE CHASSIS

CROSS-REFERENCE TO RELATED APPLICATION(S)

This application is based on and claims priority under U.S.C. 119 to Korean Patent Application No. 10-2022-0176025, filed on Dec. 15, 2022, in the Korean Intellectual Property Office, the disclosure of which is herein incorporated by reference in its entirety.

BACKGROUND OF THE DISCLOSURE

1. Technical Field

The present disclosure relates to a vehicle chassis having a rear floor frame manufactured in a casting process to be positioned on the rear floor of the vehicle.

2. Description of the Prior Art

Vehicle chassis may be divided into frame bodies and monocoque bodies according to the manufacturing schemes. Vehicle chassis manufactured using frame bodies have the advantage of high levels of rigidity and durability against external impacts, but have the problem of increased weight, which increases the weight of the vehicle.

Conventionally, vehicle chassis have been manufactured using monocoque bodies in order to increase production rates as vehicles have become more widespread. Such vehicle chassis have a high degree of manufacturability and can be made lightweight, thereby solving the problem of the increased vehicle weight when frame bodies are used. However, chassis based on monocoque bodies have a problem in that a desired rigidity cannot be obtained, making them easily deformed and damaged by external impacts.

Recently, there has been development of optimized monocoque bodies, which combine the advantages of frame bodies with the advantages of monocoque bodies in order to solve the above-mentioned problems. Electrified vehicles may be produced with optimized monocoque bodies. For example, an upper frame corresponding to the upper portion of a vehicle chassis and a lower frame corresponding to the lower portion thereof may be separately manufactured and then connected, thereby producing a single chassis.

The lower frame may be divided into a front wheel housing, a rear wheel housing, a front floor, and a rear floor. The lower frame may be manufactured in a casting process in order to reduce the chassis weight and to improve compatibility with various components to be mounted on the lower frame. The rear wheel housing and the rear floor may be manufactured integrally through casting, or the rear wheel housing and the rear floor may be separately manufactured through casting.

However, there is a problem in that the rear wheel housing and the rear floor have large sizes as chassis parts and, if manufactured in a casting process, cannot be manufactured with desired thicknesses because only predetermined thicknesses can be obtained through casting. There is another problem in that desired rigidity cannot be obtained because an open-section structure (not closed-section structure) is obtained through casting in order to facilitate restoration after deformation occurs due to an external impact.

Particularly, the above-mentioned problems need to be considered in connection with the rear floor for supporting the chassis against a rear-end collision or side collision and withstanding external forces transferred from below through rear wheels.

The above description regarding background technologies has been made only to enhance understanding of the background of the present disclosure. Therefore, the above description is not to be deemed by those of ordinary skill in the art to correspond to already-known prior art.

SUMMARY OF THE DISCLOSURE

The present disclosure has been proposed to solve the above-mentioned problems, and may provide a vehicle chassis wherein, when a rear floor frame positioned on the rear floor of the vehicle is manufactured in a casting process, a cross member manufactured in an extrusion process is inserted therein. The strength and rigidity of the rear floor frame are thereby increased.

The technical subjects pursued in the present disclosure may not be limited to the above mentioned technical subjects. Other technical subjects which are not mentioned herein may be more clearly understood, through the following descriptions, by those of ordinary skill in the art to which the present disclosure pertains.

In accordance with an aspect of the present disclosure, a vehicle chassis may include a pair of rear side members disposed on a rear floor of a vehicle so as to extend in a longitudinal direction of the vehicle while being spaced apart in a transverse direction of the vehicle. The pair of rear side members may be manufactured in a casting process. The vehicle chassis may also include a cross member configured to extend in the transverse direction of the vehicle and may be manufactured in an extrusion process. The cross member may be inserted into a mold when the rear side members are cast such that both ends of the cross member are connected to the rear side members disposed on both sides, respectively.

For example, the cross member may be inserted into the mold after surface treatment of parts of the cross member to be connected to the rear side members when the rear side members are cast.

For example, the surface treatment may be performed by laser texturing including at least one of laser patterning and laser structuring.

For example, the cross member may be extruded to have a closed-section shape in which both ends are open, and at least one channel is formed. The cross member may be inserted into the mold after blocking treatment is performed to prevent inflow of a casting material into the open ends when the rear side members are cast.

For example, the open ends of the cross member may be blocked by using at least one of a slide mold and a cap.

For example, when the open ends of the cross member are blocked using the cap, the cap and the open ends may be laser-welded to block the open ends.

For example, each rear side member may have a first mounting portion and a seat surface formed on the lower surface thereof. The first mounting portion may be connected to a subframe and a spring may be provided on the seat surface.

For example, each rear side member may have a first inner space formed to be open outward and may have a first rib formed in the formed first inner space so as to protrude outward.

For example, each rear side member may further include a connecting portion connected to another member at a side portion.

For example, the connecting portion may be formed on a side portion of the rear portion of each rear side member so as to extend upwards.

For example, each rear side member may have a first inner space formed to be open outward and may be connected to an extension member inserted into the first inner space from the rear end.

For example, the extension member may be inserted into the first inner space to be surface-coupled to the surfaces of the first inner space.

For example, the extension member may have a fastening portion formed across the extension member, and the extension member may be connected through bolting to the rear side member through the fastening portion.

For example, the vehicle chassis may further include a cross part configured to be cast together with the rear side members when the rear side members are cast. The cross part may extend in the transverse direction of the vehicle such that both ends thereof are connected to the rear side members disposed on both sides, respectively. A portion of the outer surface of the cross member inserted into the mold during casting of the rear side members may be coupled to the cross part.

For example, the portion of the outer surface of the cross member may be surface-treated, and the cross member may be coupled to the cross part through the surface-treated portion of the outer surface.

For example, the cross part may have a second inner space formed on the lower surface thereof to be open downward and may have a second mounting portion formed in the second inner space to be connected to a subframe.

For example, the cross part may have a second rib and a third rib formed to protrude downward from the second inner space.

For example, the second rib may be formed radially around the second mounting portion, and the third rib may be formed across the second inner space in the transverse direction.

A vehicle chassis according to the present disclosure is advantageous in that a cross member manufactured in an extrusion process is inserted into a mold in advance, when a rear side member is cast, so as to be connected to the rear side member such that the rear floor including the rear side member is lightweight. Rigidity of the vehicle chassis is obtained through the cross member, thereby preventing deformation due to external impacts.

In addition, when a rear side member, a cross part, and a cross member are coupled, coupling surfaces of the cross member, which are coupled to the rear side member and the cross part, are surface-treated, thereby increasing the degree of coupling or strength of the connection between the rear side member and the cross member or between the cross part and the cross member.

Advantageous effects obtainable from the present disclosure may not be limited to the above mentioned effects. Other effects not mentioned herein may be more clearly understood through the following description by those of ordinary skill in the art to which the present disclosure pertains.

BRIEF DESCRIPTION OF THE DRAWINGS

The above and other aspects, features, and advantages of the present disclosure should become more apparent from the following detailed description taken in conjunction with the accompanying drawings, in which.

DETAILED DESCRIPTION OF EMBODIMENTS

Figure 1:
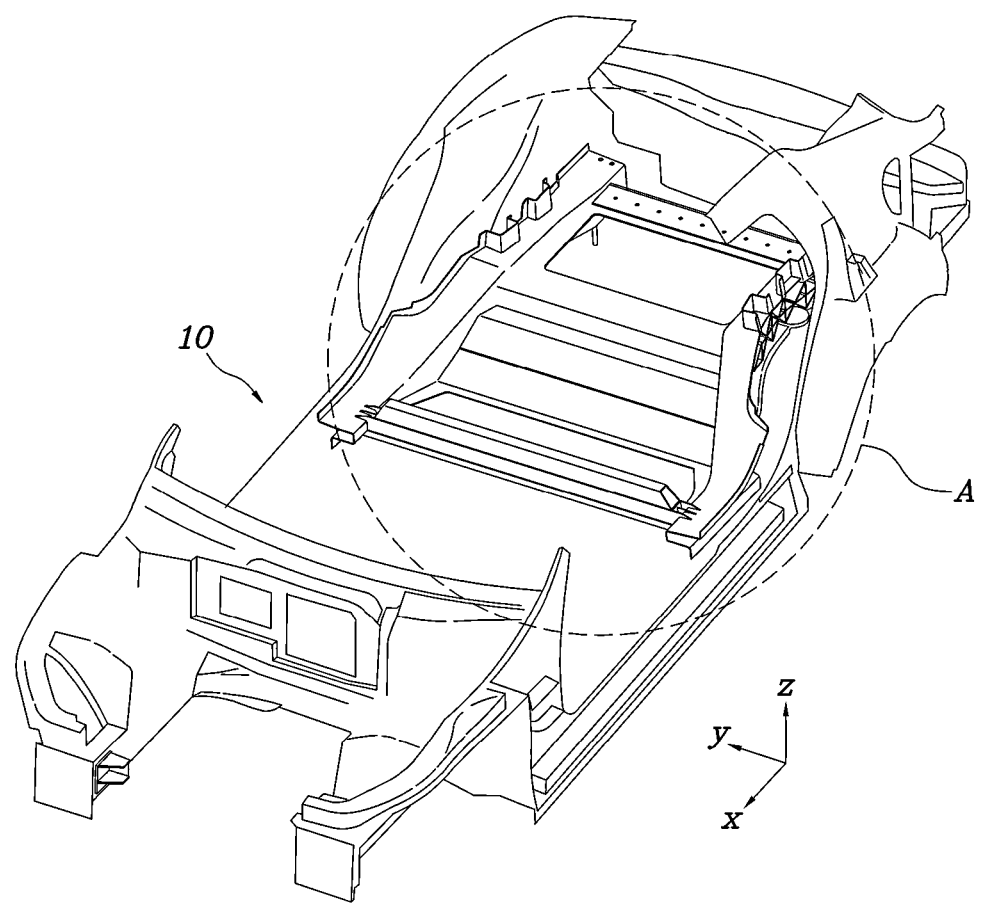
FIG. 1 is a partial perspective view of a vehicle chassis according to an embodiment of the present disclosure.

In describing the embodiments disclosed in the present specification, where the detailed description of the relevant known technology is determined to unnecessarily obscure the gist of the present disclosure, a detailed description thereof has been omitted. Furthermore, the accompanying drawings are provided only to enhance understanding of the embodiments disclosed in the present specification. The technical spirit of the disclosure is not limited to the accompanying drawings, and it should be understood that all changes, equivalents, or substitutes thereof are included in the spirit and scope of the present disclosure.

Terms including an ordinal number such as "first", "second", or the like may be used to describe various elements, but the elements are not limited by the terms. The above terms are used only for the purpose of distinguishing one element from another element.

In the case where an element is referred to as being "connected" or "coupled" to any other element, it should be understood that another element may be provided therebetween, as well as that the element may be directly connected or coupled to the other element. In contrast, in the case where an element is "directly connected" or "directly coupled" to any other element, it should be understood that no other element is present therebetween.

A singular expression may include a plural expression unless they are definitely different in a context.

As used herein, the expressions "include" or "have" and variations thereof are intended to specify the existence of mentioned features, numbers, steps, operations, elements, components, or combinations thereof, and should be construed as not precluding the possible existence or addition of one or more other features, numbers, steps, operations, elements, components, or combinations thereof. When a component, device, element, or the like of the present disclosure is described as having a purpose or performing an operation, function, or the like, the component, device, or element should be considered herein as being "configured to" meet that purpose or perform that operation of function.

Hereinafter, embodiments set forth herein are described in detail with reference to the accompanying drawings, wherein similar or like elements are provided with similar or like reference numerals, and repetitive descriptions thereof have been omitted.

A vehicle chassis according to an embodiment of the present disclosure is described with reference to FIG. 1.

FIG. 1 is a partial perspective view of a vehicle chassis according to an embodiment of the present disclosure.

FIG. 1 illustrates a portion corresponding to a lower frame of a vehicle chassis 10. The vehicle chassis 10 according to an embodiment of the present disclosure may refer to a part formed on a rear floor (portion A) positioned backward or at a rearward position (x-direction) among the lower frame. It should be assumed in the following description with reference to FIG. 2-FIG. 12 that components of the vehicle chassis 10 according to an embodiment of the present disclosure are formed on the rear floor (portion A).

Figure 2:
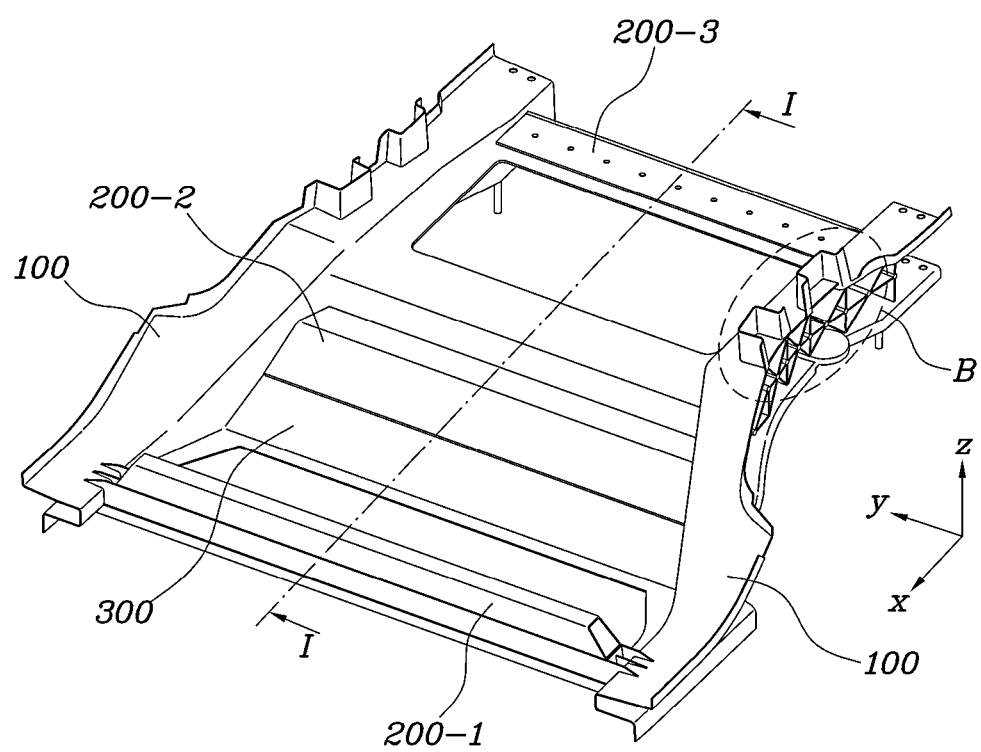
FIG. 2 is a perspective view of portion A in FIG. 1, seen from above, according to an embodiment of the present disclosure.

FIG. 2 is a perspective view of portion A in FIG. 1, seen from above, according to an embodiment of the present disclosure.

Referring to FIG. 2, the vehicle chassis 10 according to an embodiment of the present disclosure may include a pair of rear side members 100, which are disposed on the rear floor of the vehicle, which are spaced apart in the transverse direction (y-direction) of the vehicle, which extend in the longitudinal direction (x-direction) of the vehicle, and which are manufactured in a casting process. The vehicle chassis 10 may further include a cross member 200, which extends in the transverse direction (y-direction) of the vehicle, which is manufactured in an extrusion process, and which is inserted into a mold, cavity, die, or the like when the rear side members 100 are cast such that both ends thereof are connected to the rear side members 100 disposed on both sides thereof, respectively. The terms mold, cavity, die, or the like may be considered interchangeable as used herein and may refer to the manufacturing cavity in which the parts are formed, whether molded, cast, or otherwise formed.

The cross member 200 may be manufactured through extrusion by using an aluminum material, or a mixture of steel, magnesium, carbon fiber reinforced plastic (CFRP), glass fiber reinforced plastic (GFRP), or the like.

Hereinafter, coupling of the cross member 200 is described first.

When the rear side members 100 are cast, surface-treated parts of the cross member 200 may be inserted into a mold to be connected to the rear side members 100. For example, both ends of the cross member 200 may be surface-treated, and rear side members 100 may be cast after the surface-treated cross member 200 is inserted.

The cross member 200 may be surface-treated by laser texturing including at least one of laser patterning and laser structuring. Laser texturing may refer to emitting a laser onto the cross member 200 such that micro-level grooves are formed on the surface of the cross member 200. For example, laser patterning may refer to emitting a laser perpendicularly onto the surface of the cross member 200 so as to form grooves, and laser structuring may refer to emitting a laser onto the surface of the cross member 200 at various angles to form inclined grooves (for example, undercut structures).

Figure 13:
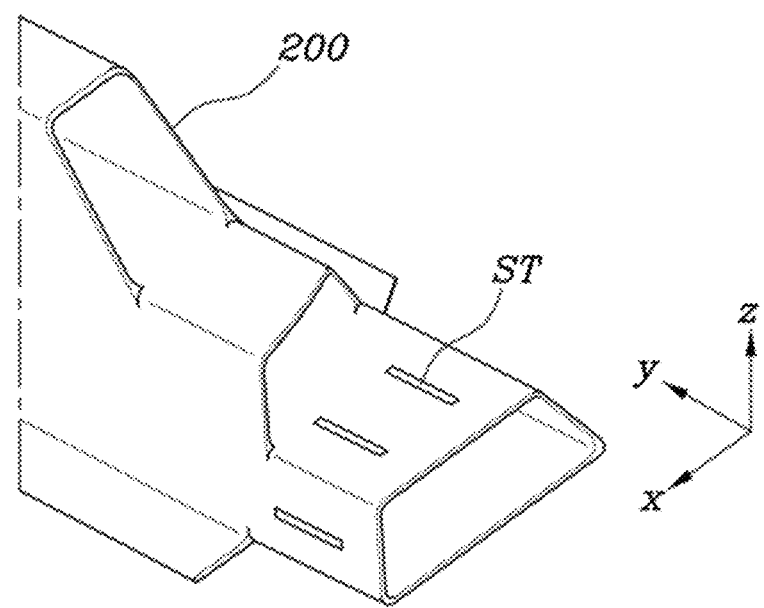
FIG. 13 is a perspective view of one end of a cross member, which has undergone surface treatment according to an embodiment of the present disclosure.

In addition, the cross member 200 may be surface-treated along the longitudinal direction of the cross member 200 or along the transverse direction thereof. FIG. 13 is a perspective view of one end of a cross member, which has undergone surface treatment according to an embodiment of the present disclosure. Although only one of the two ends of the cross member 200 is illustrated in FIG. 13, this is for convenience of description, and it is to be understood that the surface treatment may actually be applied to the two ends identically. Referring to FIG. 13, surface treatment ST may be performed on one end of the cross member 200 coupled to the rear side members 100 along the longitudinal direction (y-direction) of the cross member 200. However, this is only an example, and it should be apparent that, unlike the illustration in FIG. 13, surface treatment may be performed on an end of the cross member 200 along the transverse direction (x-direction) of the cross member 200.

If the cross member 200 is surface-treated through laser texturing, the casting material that is melted during casting of the rear side members 100 may infiltrate grooves formed on the surface of the cross member 200. This may increase the strength of the coupling or connection between the rear side members 100 and the cross member 200.

The vehicle chassis 10 according to an embodiment of the present disclosure may further include a cross part 300 which is cast together with the rear side members 100 when the rear side members 100 are cast. The cross part 300 may extend in the transverse direction (y-direction) of the vehicle such that both ends thereof are connected to the rear side members 100 disposed on both sides thereof, respectively. When the cross part 300 is included, the cross member 200 inserted into a mold during casting of the rear side members 100 may be coupled to the cross part 300. Particularly, the cross part 300 may be coupled to a portion of the outer surface of the cross member 200.

Figure 14:
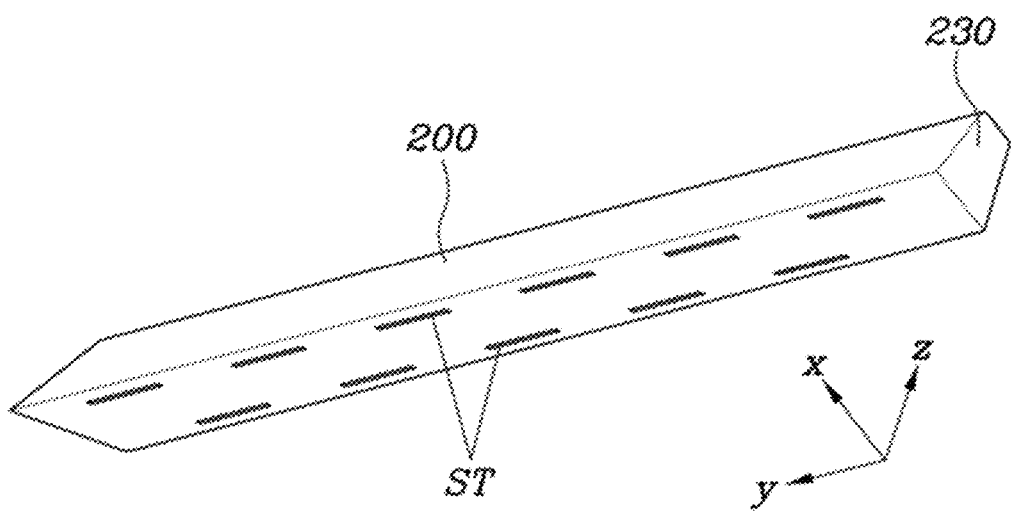
FIG. 14 is a perspective view of the outer surface of a cross member, which has undergone surface treatment according to an embodiment of the present disclosure.

A portion of the outer surface of the cross member 200 coupled to the cross part 300 may be surface-treated such that the cross member 200 and the cross part 300 are coupled through or via the surface-treated portion or side. FIG. 14 is a perspective view of the outer surface of a cross member, which has undergone surface treatment according to an embodiment of the present disclosure. Although only a portion of the outer surface of the cross member 200 is illustrated in FIG. 14 as having undergone surface treatment, this is for convenience of description. It should be understood that surface treatment is actually applied to the entire outer surface of the cross member 200 coupled to the cross part 300 identically. Referring to FIG. 14, similarly to the above description, surface treatment ST may be performed on a portion of the outer surface of the cross member 200 coupled to the cross part 300 along the longitudinal direction (y-direction) of the cross member 200. However, this is only an example, and it should be apparent that, unlike the illustration in FIG. 14, surface treatment may be performed along the transverse direction (x-direction) of the cross member 200.

As described above, the vehicle chassis 10 according to an embodiment of the present disclosure may include a rear side member 100, a cross member 200, and a cross part 300. The rear side member 100 may be cast together with the cross part 300 so as to form the rear floor frame of the chassis 10. The cross member 200 is connected to the rear side member 100 and the cross part 300 such that, when the chassis 10 undergoes a side collision, collision energy resulting from the collision is transferred in the longitudinal direction (x-direction) of the vehicle, thereby preventing the vehicle from deforming in the transverse direction (y-direction) of the vehicle.

However, this is only an example, and it should be apparent that the vehicle chassis 10 may include more or fewer components than the above-mentioned components.

A cross member 200 according to an embodiment of the present disclosure is described with reference to FIG. 3-6.

Figure 3:
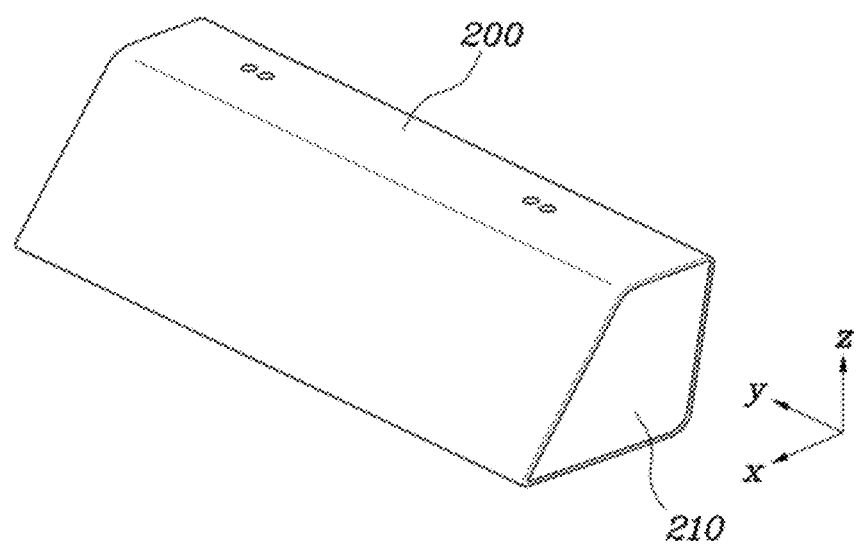
FIGS. 3-5 are sectional views taken along I-I in FIG. 2 according to an embodiment of the present disclosure.

FIG. 3 illustrates the shape of a cross member 200 according to an embodiment of the present disclosure.

Referring to FIG. 3, the cross member 200 according to an embodiment of the present disclosure may be extruded to have a closed-section shape in which both ends thereof are open, and at least one channel 210 is formed. The cross member 200 may be inserted into a mold after blocking treatment is performed such that the casting material does not flow into the open ends of the cross member 200 during casting of the rear side members 100. If the cross member 200 is extruded in an extrusion process so as to have a closed-section shape in which the inside thereof is full, the cross member 200 may have an increased weight, which may make it difficult to make the rear floor lightweight. Therefore, the cross member 200 according to an embodiment of the present disclosure may be extruded to have a closed-section shape in which at least one channel 210 is formed, as a structure capable of both making the rear floor lightweight and securing rigidity.

The cross member 200 having a single channel 210 formed therein may be extruded to have a small section size, thereby obtaining a desired rigidity as a member. In the case of a cross member 200 having multiple channels 210 formed therein, separating plates 220 may be formed across the inner space of the cross member 200 so as to distinguish respective channels 210, thereby obtaining a desired rigidity of the cross member 200. This is described hereinafter with reference to FIGS. 4-6.

Since both ends of the cross member 200 are open, a casting material may flow into the cross member 200 through the two open ends during casting of the rear side members 100. Therefore, the cross member 200 according to an embodiment of the present disclosure may be inserted after the open ends are blocked. The open ends may be blocked by using at least one of a slide mold and a cap 230.

For example, when the open ends of the cross member 200 are blocked by using a slide mold (not illustrated), the slide mold (not illustrated) may be positioned in a mold for casting the rear side members 100. In other words, a slide mold positioned in a mold for casting the rear side members 100 may be positioned in each open end of the cross member 200 so as to prevent a casting material from flowing into the cross member 200 during casting of the rear side members 100.

In addition, a cap 230 (see FIG. 14) may be used to block each open end of the cross member 200 by coupling the cap 230 and the end of the cross member 200 through laser welding. This may prevent a casting material from flowing into the cross member 200 during casting of the rear side members 100.

Referring to FIG. 2, according to an embodiment of the present disclosure multiple cross members 200 may be configured as described above. More specifically, a cross member 200-1 may be positioned on the front portion, a cross member 200-2 may be positioned on the middle portion, and a cross member 200-3 may be positioned on the rear portion, according to the position of connection to the rear side members 100. In addition, multiple cross parts 300 may be formed to correspond to the multiple cross members 200-1, 200-2, and 200-3 in respective positions. Cross members 200 in respective positions are described with reference to FIGS. 4-6.

Figure 4:
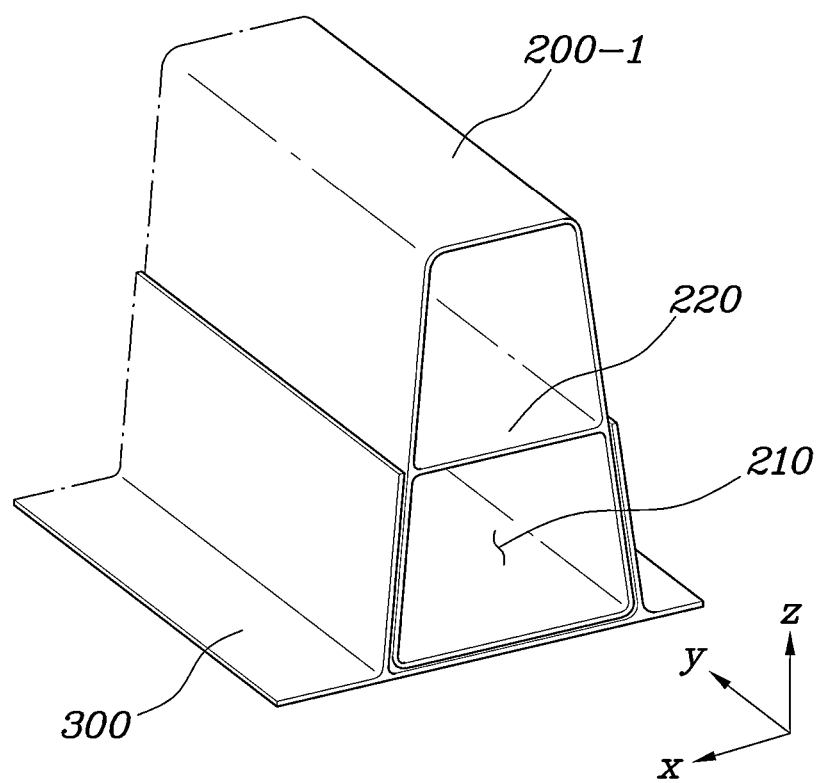
Figure 5:
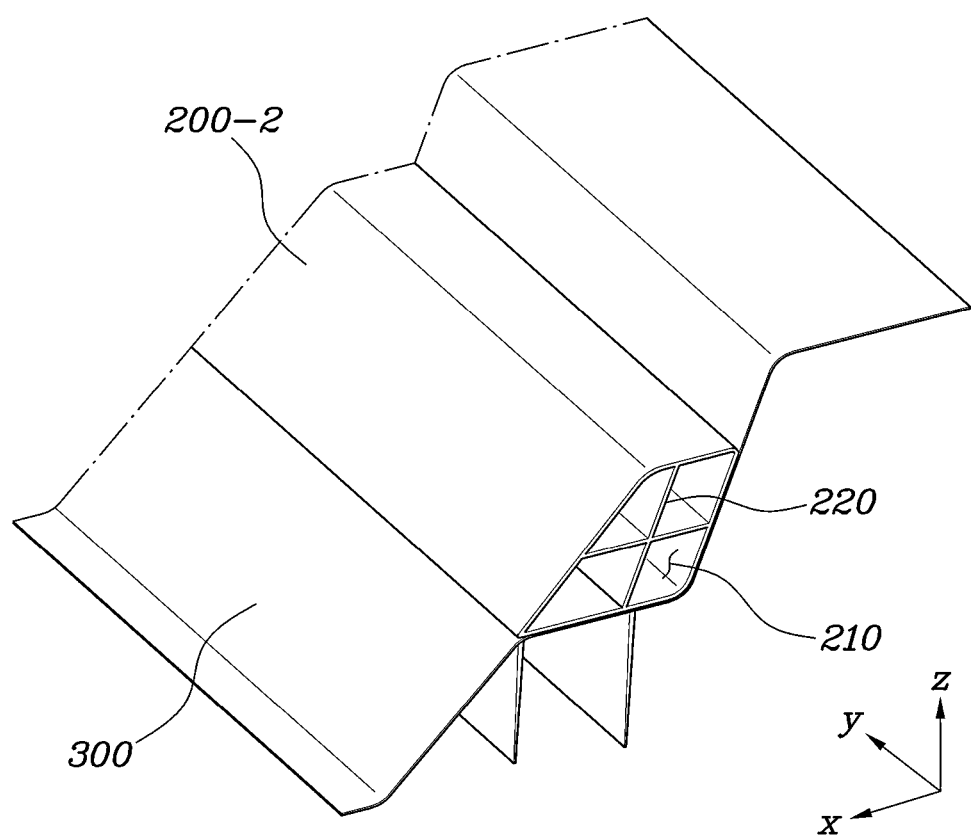
Figure 6:
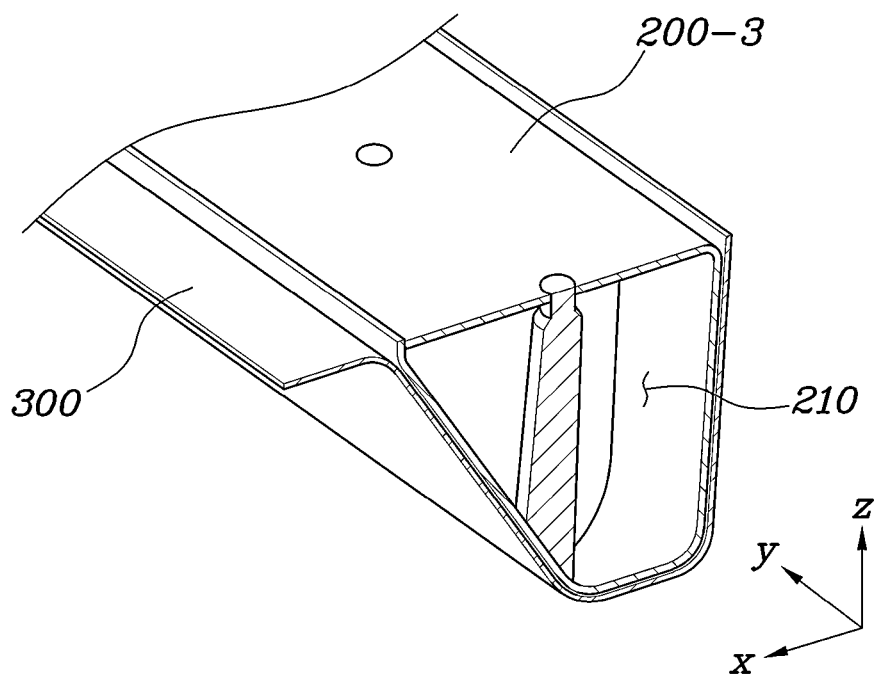
FIG. 6 illustrates the shape of a cross member according to an embodiment of the present disclosure.

FIGS. 4-6 are sectional views taken along I-I in FIG. 2 according to an embodiment of the present disclosure.

FIGS. 4-6 may illustrate different sections according to the position in which the cross members 200 and the rear side members 100 are connected.

For example, the cross member 200-1 positioned on the front portion in FIG. 2 may have the section illustrated in FIG. 4. It is clear from FIG. 4 that a portion of the outer surface of the cross member 200-1 is coupled to the cross part 300. Accordingly, the portion of the outer surface of the cross member 200-1, which corresponds to the cross part 300 during coupling, may be solely surface-treated, thereby increasing the degree of coupling between the cross member 200-1 and the cross part 300. The cross member 200-1 may be formed such that the transverse length of the lower portion in the x-direction is larger than the transverse length of the upper portion in the x-direction. Such a shape may guarantee that, when the cross member 200-1 is formed, an undercut structure is formed when the cross member 200-1 and the cross part 300 are coupled. The degree of coupling or strength of the connection is thereby increased between the cross member 200-1 and the cross part 300.

The cross member 200-1 may be manufactured to have a closed-section shape in an extrusion process and to have a hollow shape in which at least one channel 210 is formed. When one or more channels 210 are formed in the cross member 200-1 positioned on the front portion, the multiple channels 210 may be disposed side by side in the height or vertical direction (z-direction). As the multiple channels 210 are disposed side by side in the height direction (z-direction), a separating plate 220 may be formed in the inner space of the cross member 200-1 positioned on the front portion so as to extend across the inner space in the longitudinal direction (x-direction). Formation of the separating plate 220 may increase the rigidity of the cross member 200-1 positioned on the front portion.

The cross member 200-2 positioned on the middle portion in FIG. 2 may have the section illustrated in FIG. 5. It is clear from FIG. 5 that a portion of the outer surface of the cross member 200-2 positioned on the middle portion is coupled to the cross part 300. Unlike the cross member 200-1 positioned on the front portion illustrated in FIG. 3, the cross member 200-2 positioned on the middle portion does not form an undercut structure and may be coupled to the cross part 300 simply through surface coupling. However, this is only an example, and is not limiting in any manner. For example, when the cross part 300 is coupled to the cross member 200-2 so as to surround a portion of the outer surface of the cross member 200-2, the cross member 200-2 positioned on the middle portion may form an undercut structure.

The cross member 200-2 positioned on the middle portion may be manufactured to have a closed-section shape in an extrusion process and to have a hollow shape in which at least one channel 210 is formed. The cross member 200-2 may have multiple channels 210 formed to be positioned adjacent to each other. As multiple channels 210 are positioned adjacent to each other, multiple separating plates 220 may be formed in the inner space of the cross member 200-2 positioned on the middle portion so as to extend across the inner space in the longitudinal direction (x-direction) and in the height direction (z-direction). Formation of multiple separating plates 220 may increase the rigidity of the cross member 200-2 positioned on the middle portion.

The cross member 200-3 positioned on the rear portion in FIG. 2 may have the section illustrated in FIG. 6. It is clear from FIG. 6 that a portion of the outer surface of the cross member 200-3 positioned on the rear portion is coupled to the cross part 300. Although not illustrated in FIG. 5, the cross member 200-3 positioned on the rear portion may be coupled to the cross part 300 simply through surface coupling, or may form an undercut structure, thereby increasing the degree of coupling or strength of the connection between the cross member 200-3 and the cross part 300.

The cross member 200-3 positioned on the rear portion may be manufactured to have a closed-section shape in an extrusion process and to have a hollow shape in which a channel 210 is formed.

Referring to FIGS. 4-6, when multiple cross members 200 are configured, the cross members 200 may have different section shapes according to the position in which the cross members 200 and the rear side members 100 are connected. However, this is only an example, and the above-mentioned section shapes are not limiting in any manner.

The shape of a rear side member 100 and that of a cross part 300 are described with reference to FIGS. 7-12.

Figure 7:
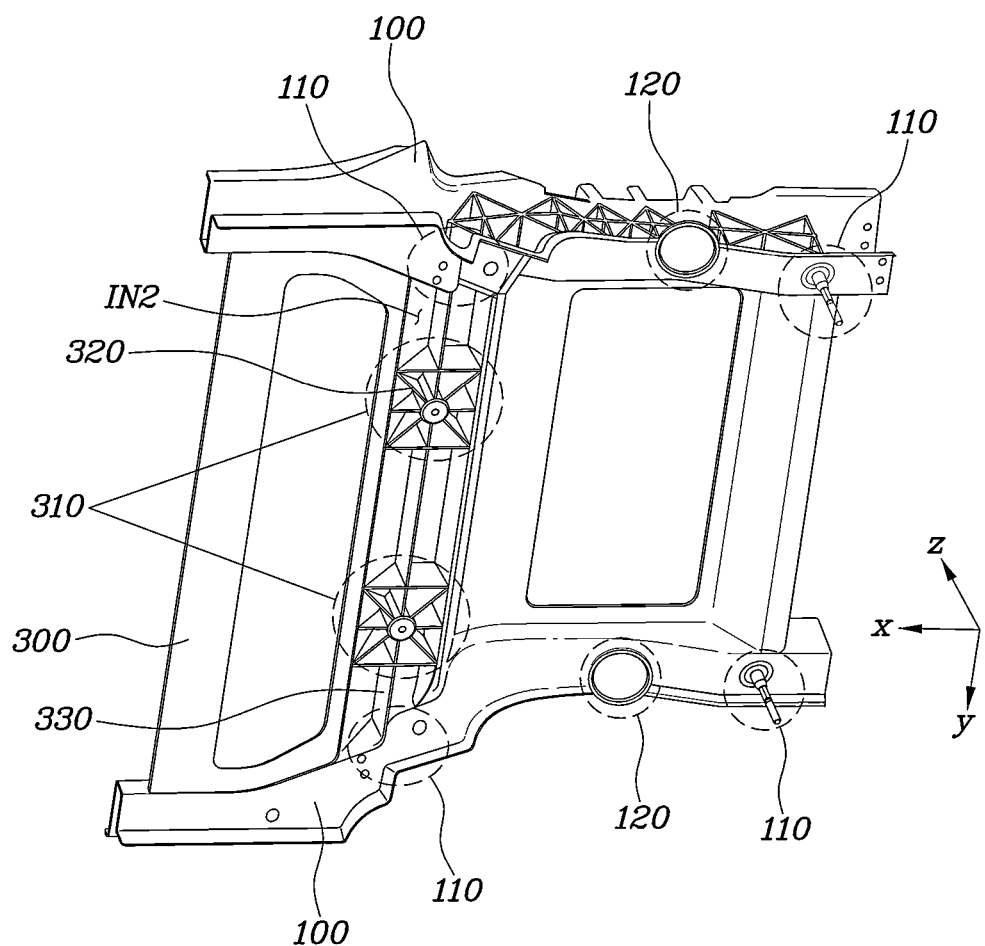
FIG. 7 is a perspective view of portion A in FIG. 1, seen from below, according to an embodiment of the present disclosure.

FIG. 7 is a perspective view of portion A in FIG. 1, seen from below, according to an embodiment of the present disclosure.

Referring to FIG. 7, the rear side member 100 may have a first mounting portion 110 and a seat surface 120 formed on the lower surface thereof. The first mounting portion 110 is coupled to a subframe (not illustrated) and a spring (not illustrated) is provided on the seat surface 120. The rear floor of the vehicle may be directly connected to a suspension device mounted on the rear portion of the vehicle or connected to a subframe provided with a suspension device. The rear side member 100 disposed on the rear floor of the vehicle may thus be directly connected to the suspension connected to the subframe. The rear side member 100 may be bolt-connected to the subframe through the first mounting portion 110. When the rear side member 100 is connected to the subframe, the spring included in the suspension device may be seated on the seat surface 120 formed on the rear side member 100.

The rear side member 100 may be connected to the subframe through the first mounting portion 110 and the seat surface 120 so as to receive an external force transferred in the height direction (z-direction) through the subframe. For example, vibrations occurring in the vehicle may be transferred in the height direction (z-direction) through the first mounting portion 110 and the seat surface 120 and then be applied to the rear side member 100. The rear side member 100 may thus need to secure durability sufficient to withstand forces transferred in the height direction (z-direction). This is described with reference to FIG. 8 and FIG. 9.

Figure 8:
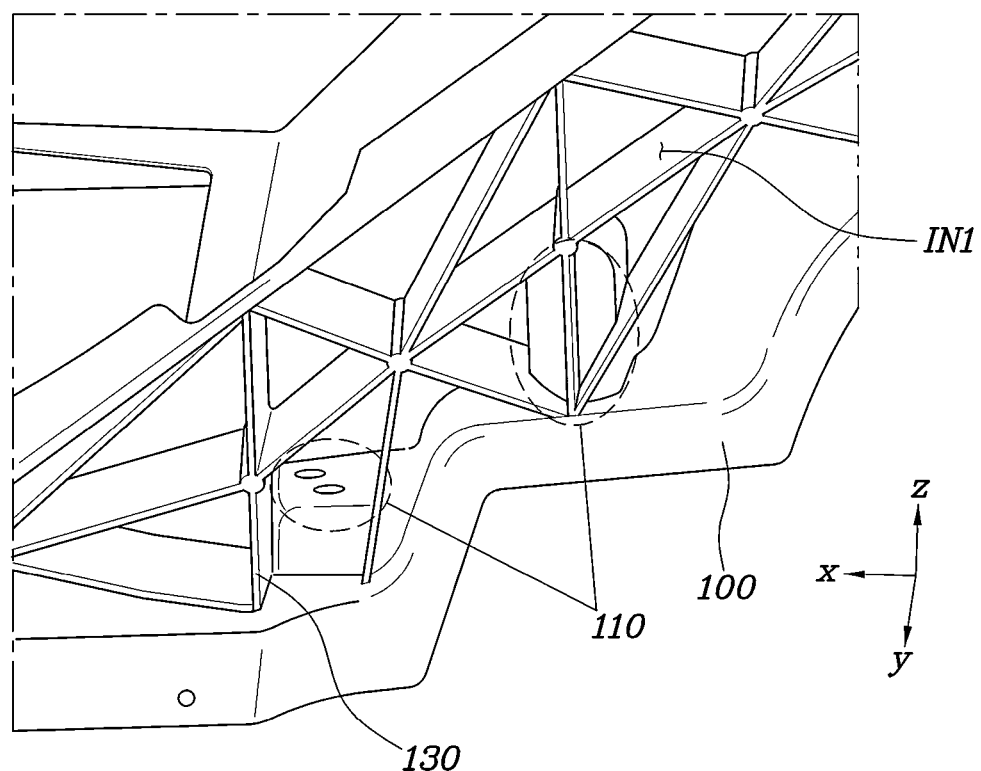
FIG. 8 and FIG. 9 are side perspective views of a rear side member according to an embodiment of the present disclosure.
Figure 9:
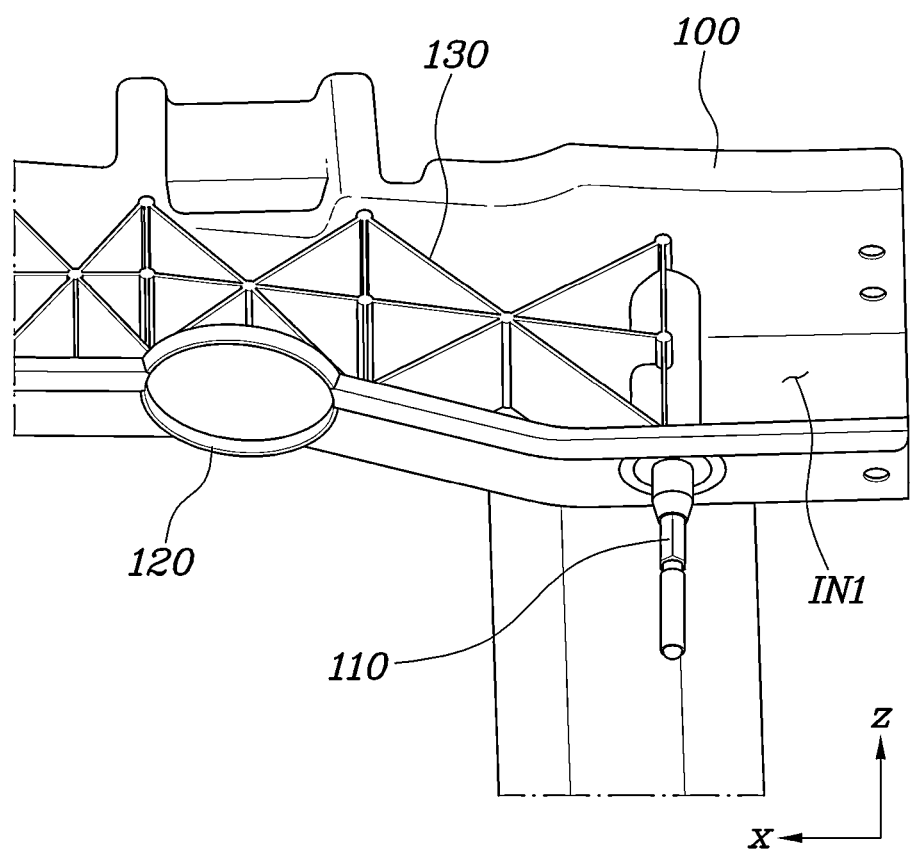

FIG. 8 and FIG. 9 are side perspective views of a rear side member according to an embodiment of the present disclosure.

Referring to FIG. 8 and FIG. 9, in order to secure durability of the rear side member 100, the rear side member 100 may have a first inner space IN1 formed to be open in the outward direction (y-direction), for example, toward an exterior of the vehicle chassis 10, and may have a first rib 130 formed on the first inner space IN1 so as to protrude in the outward direction (y-direction). Multiple first ribs 130 may be formed along the first inner space IN1.

Referring to FIG. 8, the first rib 130 may be formed in the first inner space IN1 which is open in the outward direction (y-direction) of the rear side member 100. The first rib 130 may be positioned to correspond to the first mounting portion 110. As the first rib 130 protrudes from the first inner space IN1 in the outward direction (y-direction), the first rib 130 may distribute a force transferred in the height direction (z-direction). As a force is transferred through the first mounting portion 110 in the height direction (z-direction), the transferred force may be moved through the first rib 130 in the height direction (z-direction) and distributed in various directions. In other words, the first rib 130 may form a load path such that the force transferred in the height direction (z-direction) is distributed in the vertical direction (not horizontal direction) inside the rear side member 100.

Referring to FIG. 9, another first rib 130 may be formed in the first inner space IN1 and positioned to correspond to the seat surface 120. A force transferred in the height direction (z-direction) through the spring mounted on the seat surface 120 may be distributed through the first rib 130, thereby securing the inner strength of the rear side member 100.

Referring back to FIG. 7, the cross part 300 connected to rear side members 100 on both sides is described.

Referring to FIG. 7, the cross part 300 may have a second inner space IN2 formed on the lower surface thereof to be open downwards. A second mounting portion 310 may be formed in the second inner space IN2 to be connected to the subframe. If the second mounting portion 310 is connected to the subframe, a force transferred through the subframe may be transferred to the second mounting portion 310 in the height direction (z-direction). If forces are accumulated and transferred to the second mounting portion 310, the durability of the cross part 300 may be affected.

Therefore, a second rib 320 and a third rib 330 may be formed in the second inner space IN2 of the cross part 300 so as to protrude downwards. The second rib 320 may be formed on the periphery of the second mounting portion 310. Particularly, the second rib 320 may be formed radially around the second mounting portion 310. The second rib 320 may protrude downwards so as to form a load path such that, unlike the above-mentioned first rib 130, a force transferred in the height direction (z-direction) is distributed in the horizontal direction.

The third rib 320 may protrude downwards from the second inner space IN2 so as to extend in the transverse direction (y-direction) of the vehicle. The third rib 330 may form a load path such that a force transferred in the height direction (z-direction) through the second mounting portion 310 is long-distributed in the transverse direction (y-direction), thereby ensuring the durability of the cross part 300.

Figure 10:
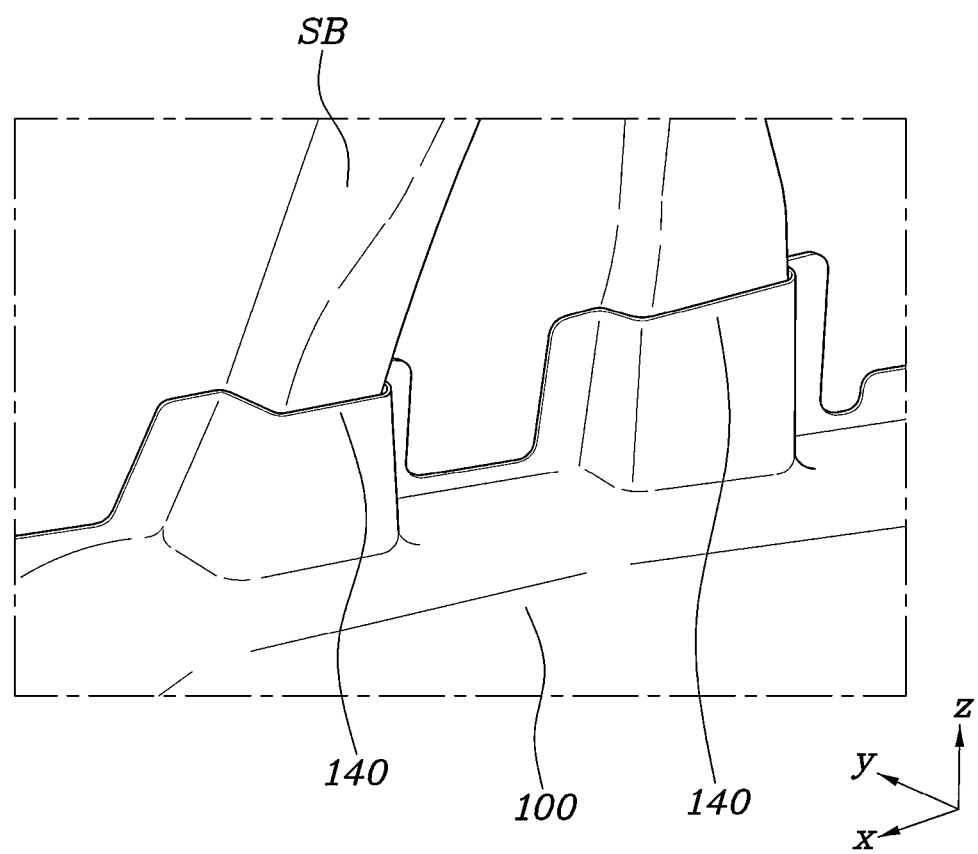
FIG. 10 is a magnified perspective view of portion B in FIG. 2 according to an embodiment of the present disclosure.

FIG. 10 is a magnified perspective view of portion B in FIG. 2 according to an embodiment of the present disclosure.

Referring to FIG. 10, the rear side member 100 according to an embodiment of the present disclosure may further include a connecting portion 140 provided on a side portion to be connected to another member. When the chassis is assembled, the rear side member 100 may be connected to another member, for example, to a side body SB such as a rear wheel housing. When connected to the side body SB, the rear side member 100 may form a connecting portion 140 such that the connecting portion 140 fully contacts the side body SB. The structure of the connecting portion 140 may be implemented through a draft angle.

The connecting portion 140 may be positioned on a side of the rear portion of the rear side member 100 as illustrated in part B of FIG. 2, and may be formed to extend upwards in order to improve connectivity with the side body SB. The rear side member 100 may be connected to the side body SB through an upwardly extending surface of the connecting portion 140. The rear side member 100 and the side body SB may be connected or coupled in a different manner when different types of materials are used. For example, the rear side member 100 and the side body SB may be connected or coupled in various manners, including via self-piercing rivets (SPR), flow drill screws (FDS), and bolts, such that different types of materials are coupled through the connecting portion 140.

Hereinafter, an extension member 400 connected to a rear side member 100 according to an embodiment of the present disclosure is described with reference to FIG. 11 and FIG. 12.

Figure 11:
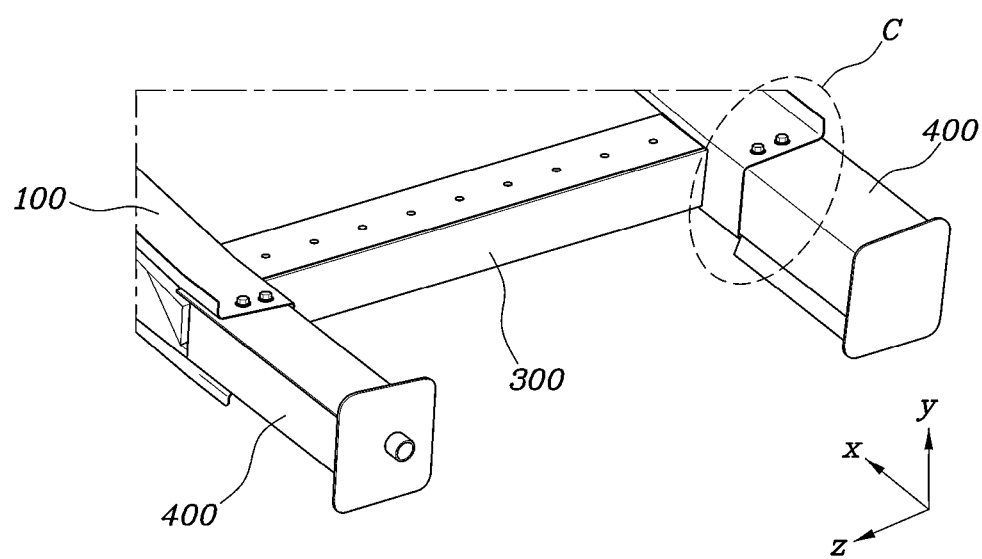
FIG. 11 is a magnified perspective view of the rear portion of a rear side member according to an embodiment of the present disclosure.

FIG. 11 is a magnified perspective view of the rear portion of a rear side member according to an embodiment of the present disclosure.

Referring to FIG. 11, the rear side member 100 may be connected to an extension member 400. Specifically, the rear side member 100 may have a first inner space IN1 formed to be open in the outward direction (y-direction). An extension member 400 may be inserted into the first inner space IN1 from the rear end such that the rear side member 100 and the extension member 400 are connected. One end of the extension member 400 may be connected to the rear side member 100, and the other end thereof, which is not connected to the rear side member 100, may be connected to another member. For example, the other end of the extension member 400 may be connected to the rear bumper.

According to the above description, a first rib 130 is formed in the first inner space IN1 of the rear side member 100. However, the first rib 130 may not be formed in a space positioned at the rear end of the rear side member 100 within the first inner space IN1. The extension member 400 may be inserted into the first inner space IN1 of the rear side member 100 so as to be surface-coupled to the surfaces of the first inner space IN1 other than the open side of the first inner space IN1. An additional structure may be applied to the extension member 400 in order to ensure that the same is connected and coupled to the rear side member 100. This is described with reference to FIG. 12.

Figure 12:
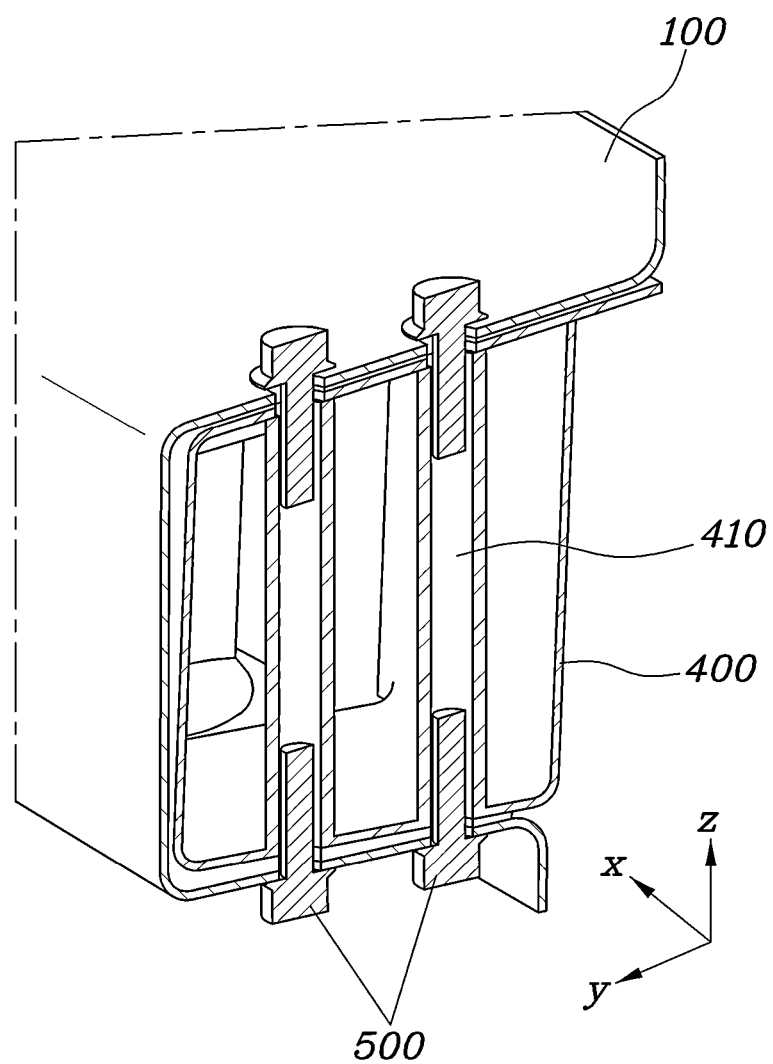
FIG. 12 is a sectional view of portion C in FIG. 11 according to an embodiment of the present disclosure.

FIG. 12 is a sectional view of portion C in FIG. 11 according to an embodiment of the present disclosure.

Referring to FIG. 12, the rear side member 100 according to an embodiment of the present disclosure may be connected to an extension member 400 through surface coupling at the rear end thereof. The extension member 400 may have a fastening portion 410 so as to ensure connectivity and coupling rigidity with the rear side member 100.

The extension member 400 may have a fastening portion 410 formed across the extension member 400. The extension member 400 may be connected through bolting with the rear side member 100 through the fastening portion 410. For example, as illustrated in FIG. 12, the extension member 400 may have a fastening portion 410 formed to extend across the extension member 400 in the upward/downward direction. The rear side member 100 may have a through-hole (not illustrated) formed therein to be connected to the fastening portion 410 of the extension member 400. A bolt 500 may be inserted through the through-hole of the rear side member 100 to be seated in the fastening portion 410 of the extension member 400. The bolt 500 may be configured to correspond to the fastening portion 410 formed on the extension member 400. For example, as illustrated in FIG. 12, bolts 500 may be inserted from above and below, depending on the shape of the fastening portion 410 (double bolting).

According to the vehicle chassis 10 according to an embodiment of the present disclosure described above, a cross member 200 manufactured in an extrusion process is inserted into a mold in advance, when a rear side member 100 is cast, so as to be connected to the rear side member 100 such that the rear floor including the rear side member 100 is lightweight. Rigidity of the vehicle chassis 10 is obtained through the cross member 200, thereby preventing deformation of the vehicle chassis 10 due to external impacts.

In addition, when a rear side member 100, a cross part 300, and a cross member 200 are coupled, coupling surfaces of the cross member 200, which are coupled to the rear side member 100 and the cross part 300, are surface-treated. The degree of coupling or the strength of the connection is thereby increased between the rear side member 100 and the cross member 200 or between the cross part 300 and the cross member 200.

Although the present disclosure has been described and illustrated in conjunction with particular embodiments thereof, it should be apparent to those of ordinary skill in the art that various improvements and modifications may be made to the embodiments of the present disclosure without departing from the technical idea of the present disclosure defined by the appended claims. Therefore, the above description shall be considered not as limiting, but as illustrative in all aspects. The scope of the present disclosure shall be determined by reasonable interpretation of the appended claims, and all changes and modifications within an equivalent scope of the present disclosure fall within the scope of the present disclosure.

BRIEF DESCRIPTION OF REFERENCE NUMERALS

10: chassis
100: rear side member
110: first mounting portion
120: seat surface
130: first rib
140: connecting portion
200: cross member
210: channel
220: separating plate
230: cap
300: cross part
310: second mounting portion
320: second rib
330: third rib
400: extension member
410: fastening portion
500: bolt

What is claimed is:

1. A vehicle chassis comprising:
a pair of rear side members disposed on a rear floor of a vehicle so as to extend in a longitudinal direction of the vehicle while being spaced apart in a transverse direction of the vehicle, wherein the pair of rear side members is manufactured in a casting process; and
a cross member configured to extend in the transverse direction of the vehicle and manufactured in an extrusion process, the cross member being inserted into a mold when the rear side members are cast such that both ends of the cross member are connected to the rear side members disposed on both sides, respectively.

2. The vehicle chassis of claim 1, wherein the cross member is inserted into the mold after surface treatment of parts of the cross member to be connected to the rear side members when the rear side members are cast.

3. The vehicle chassis of claim 2, wherein the surface treatment is performed by laser texturing comprising at least one of laser patterning and laser structuring.

4. The vehicle chassis of claim 1, wherein the cross member is extruded to have a closed-section shape in which both ends are open, and at least one channel is formed, and wherein the cross member is inserted into the mold after a blocking treatment is performed to prevent inflow of a casting material into the open ends when the rear side members are cast.

5. The vehicle chassis of claim 4, wherein the open ends of the cross member are blocked by using at least one of a slide mold or a cap.

6. The vehicle chassis of claim 5, wherein, when the open ends of the cross member are blocked using the cap, the cap and the open ends are laser-welded to block the open ends.

7. The vehicle chassis of claim 1, wherein each rear side member has a first mounting portion and a seat surface formed on a lower surface thereof, wherein the first mounting portion is connected to a subframe, and wherein a spring is provided on the seat surface.

8. The vehicle chassis of claim 7, wherein each rear side member has a first inner space formed to be open outward and has a first rib formed in the formed first inner space so as to protrude outward.

9. The vehicle chassis of claim 1, wherein each rear side member further comprises a connecting portion connected to another member at a side portion.

10. The vehicle chassis of claim 9, wherein the connecting portion is formed on a side portion of a rear portion of each rear side member so as to extend upwards.

11. The vehicle chassis of claim 1, wherein each rear side member has a first inner space formed to be open outward and is connected to an extension member inserted into the first inner space from the rear end.

12. The vehicle chassis of claim 11, wherein the extension member is inserted into the first inner space to be surface-coupled to the surfaces of the first inner space.

13. The vehicle chassis of claim 11, wherein the extension member has a fastening portion formed across the extension member, and wherein the extension member is connected through bolting to the rear side member through the fastening portion.

14. The vehicle chassis of claim 1, further comprising a cross part configured to be cast together with the rear side members when the rear side members are cast, the cross part extending in the transverse direction of the vehicle such that both ends thereof are connected to the rear side members disposed on both sides, respectively, wherein a portion of an outer surface of the cross member inserted into the mold during casting of the rear side members is coupled to the cross part.

15. The vehicle chassis of claim 14, wherein the portion of the outer surface of the cross member is surface-treated, and wherein the cross member is coupled to the cross part through the surface-treated portion of the outer surface.

16. The vehicle chassis of claim 14, wherein the cross part has a second inner space formed on a lower surface thereof to be open downward and has a second mounting portion formed in the second inner space to be connected to a subframe.

17. The vehicle chassis of claim 16, wherein the cross part has a second rib and a third rib formed to protrude downward from the second inner space.

18. The vehicle chassis of claim 17, wherein the second rib is formed radially around the second mounting portion, and the third rib is formed across the second inner space in the transverse direction.

19. A method of manufacturing a vehicle chassis, the method comprising:
- extruding a cross member configured to extend in a transverse direction of a vehicle;
- inserting the cross member into a mold for casting a pair of rear side members configured to be disposed on a rear floor of the vehicle so as to extend in a longitudinal direction of the vehicle while being spaced apart in the transverse direction of the vehicle; and
- casting the pair of rear side members such that both ends of the cross member are connected to the rear side members disposed on both sides, respectively.

* * * * *